United States Patent
Klauer

(10) Patent No.: US 8,101,875 B2
(45) Date of Patent: *Jan. 24, 2012

(54) METHOD AND APPARATUS FOR DYNAMICALLY CHECK WEIGHING CONVEYED OBJECTS, USING FILTER LENGTHS THAT VARY WITH OBJECT SIZE

(75) Inventor: Alfred Klauer, Goettingen (DE)

(73) Assignee: Satorius Weighing Technology GmbH, Goettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,112

(22) Filed: Feb. 22, 2010

(65) Prior Publication Data

US 2010/0147598 A1    Jun. 17, 2010

Related U.S. Application Data

(63) Continuation of application No. PCT/EP2008/005113, filed on Jun. 25, 2008.

(30) Foreign Application Priority Data

Aug. 24, 2007    (DE) .................. 10 2007 040 300

(51) Int. Cl.
 *G01G 11/16* (2006.01)
(52) U.S. Cl. ............... 177/25.13; 177/145; 177/185; 702/101
(58) Field of Classification Search .............. 177/25.13, 177/145, 185; 702/101
See application file for complete search history.

(56) References Cited

U.S. PATENT DOCUMENTS

| | | | | |
|---|---|---|---|---|
| 4,231,439 A * | 11/1980 | Hall et al. | ................ | 177/25.14 |
| 4,817,026 A * | 3/1989 | Inoue et al. | ................ | 708/300 |
| 5,130,938 A * | 7/1992 | Inoue | ................ | 702/194 |
| 5,300,736 A | 4/1994 | Ehrhardt | | |
| 5,308,930 A * | 5/1994 | Tokutu et al. | ................ | 177/25.13 |
| 5,381,356 A * | 1/1995 | Takahashi | ................ | 708/320 |
| 6,012,031 A | 1/2000 | Oliver et al. | | |
| 6,794,586 B1 * | 9/2004 | Mason | ................ | 177/25.15 |
| 7,034,730 B2 * | 4/2006 | Siferd et al. | ................ | 341/143 |
| 7,405,368 B2 * | 7/2008 | Beck et al. | ................ | 177/25.13 |
| 7,613,575 B2 * | 11/2009 | Nussbaumer et al. | ........ | 702/41 |
| 7,739,068 B2 | 6/2010 | Reber | | |
| 2005/0023046 A1 | 2/2005 | Vilhjalmsson et al. | | |
| 2007/0181349 A1 | 8/2007 | Beck et al. | | |
| 2010/0147597 A1 | 6/2010 | Klauer | | |

FOREIGN PATENT DOCUMENTS

| | | |
|---|---|---|
| DE | 10322504 A1 | 12/2004 |
| EP | 1736748 A1 | 12/2006 |

* cited by examiner

*Primary Examiner* — Randy W Gibson
(74) *Attorney, Agent, or Firm* — Sughrue Mion, PLLC

(57) ABSTRACT

A method and an apparatus for dynamically check weighing objects ($18a$-$c$) that are guided across a weight-sensitive zone (14) of a weighing device (12) by a conveying mechanism ($20a$-$c$). At regular intervals, the weight-sensitive zone (14) supplies individual measured weight values ($E_1, \ldots, E_n$) from which resulting weight values are derived in a digital evaluation unit (16) by calculating mean values. The evaluation unit (16) includes a plurality of cascading mean value filters ($24a$-$e$) that have different filter lengths which are varied by a common scaling value in accordance with a spatial dimension of the objects ($18a$-$c$).

12 Claims, 1 Drawing Sheet

METHOD AND APPARATUS FOR DYNAMICALLY CHECK WEIGHING CONVEYED OBJECTS, USING FILTER LENGTHS THAT VARY WITH OBJECT SIZE

This application is a Continuation of International Patent Application PCT/EP2008/005113, filed on Jun. 25, 2008, and claiming priority from German Patent Application 10 2007 040 300.5, filed on Aug. 24, 2007. The complete disclosures of these patent applications are incorporated into the present application by reference.

FIELD AND BACKGROUND OF THE INVENTION

The invention relates to a method and apparatus for dynamically check weighing objects that are guided across a weight-sensitive zone of a weighing device with a conveying mechanism, wherein at regular intervals the weight-sensitive zone supplies individual measured weight values from which resulting weight values are derived in a digital evaluation unit by calculating mean values.

The invention further relates to an apparatus for dynamically check weighing objects comprising
a weighing device having a weight-sensitive zone,
a conveying mechanism that guides the objects across the weight-sensitive zone of the weighing device,
wherein the weight-sensitive zone at regular intervals supplies individual measured weight values from which a digital evaluation unit derives resulting weight values by calculating mean values.

Methods and apparatuses of this type are known from DE 103 22 504 A1 and its published US counterpart US 2007/0181349 A1, which is incorporated into the present application by reference. This published document discloses a so-called check weigher and a method for setting and operating it. "Check weigher" is understood to mean a weighing device in which objects are conveyed to the weight-sensitive zone more or less continuously by a conveying mechanism in order to weigh them there. The weighed objects are then transported further by the conveying mechanism, to, e.g., be sorted according to the weighing result. A typical field of application of such check weighers is the final inspection and testing of nominally uniform objects. Examples would be the final fill level inspection of canned goods or a package sorting system.

A fundamental problem in such systems is finding a satisfactory compromise between weighing accuracy on the one hand and weighing speed on the other. In addition, systems of this type typically operate with strong interferences in an industrial environment. A typical setup, for example, conveys the objects by a fast-running conveyor belt that transfers the objects to a separate conveyor belt section, which is supported on the weight-sensitive zone of the weighing device and transfers the objects to another conveyor belt section after weighing. In systems of this type, the weighing signal is superimposed by significant interferences firstly from the movement of the conveyor belt, secondly from the fact that the object is lying only partly on the conveyor belt section supported on the weighing device when entering and leaving this section, and thirdly from various other vibrations that arise in the industrial environment. It has therefore proven worthwhile to record a large number of individual measured weight values for one object and derive a resulting weight value by suitable calculation of a mean value, rather to than determine a single measured value. In the above published document, the mean value is formed over a particular section of the sequence of individual measured weight values. The optimum position and length of the averaging section is found by "automatic" trial-and-error as part of a pre-setting procedure in which a large number of objects are weighed while the parameters for the section are varied. of the selected parameters for the section are then retained for the succeeding checking operation of the system.

OBJECTS AND SUMMARY OF THE INVENTION

A disadvantage in the well-known method is its lack of flexibility in regard to changes in object size. Variations in object size occur frequently in practical industrial operation. In package sorting systems that separate packages of different sizes, this is the normal case. When using check weighing for nominally uniform objects, changes in object sizes can occur when batches are changed. Changes in object sizes, especially changes in length in the conveying direction, have a pronounced effect on the vibration behavior of the entire system and thus upon the filter settings needed for compensation thereof. In the known apparatus, it is therefore necessary to run a new pre-setting procedure for each change in object size, a procedure that is associated with considerable downtime and therefore cost disadvantages and that, as a result, makes the system unsuitable for sorting packages.

It is an object of the present invention to provide a check weigher and a check weighing method that assures better adaptability to varying object sizes.

According to one formulation, this object is achieved by a method for dynamically check weighing objects, which includes: conveying the objects across a weight-sensitive zone of a weighing device with a conveying mechanism; at regular intervals and from the weight-sensitive zone, supplying individual measured weight values; deriving resulting weight values in a digital evaluation unit by calculating mean values; and in the evaluation unit varying respective filter lengths of a plurality of cascading mean value filters by a common scaling value in accordance with at least one spatial dimension for given ones of the objects, especially their length in the conveying direction.

According to another formulation, an apparatus for dynamically check weighing objects includes: a weighing device with a weight-sensitive zone; a conveying mechanism that conveys the objects across the weight-sensitive zone of the weighing device, wherein the weight-sensitive zone is configured to supply individual measured weight values at regular intervals; and a digital evaluation unit configured to derive resulting weight values by calculating mean values, wherein the evaluation unit has a plurality of cascading mean value filters of different filter lengths and a filter-length adjuster configured to vary the filter lengths by a common scaling value in accordance with at least one spatial dimension for given ones of the objects, especially their respective lengths in the conveying direction.

Particularly advantageous embodiments of the invention are the subject matter of the dependent claims.

The features, effects and advantages of the method according to the invention and the apparatus according to the invention will be discussed together below.

The invention makes use of inherent characteristics of so-called mean value filter cascades. A "mean value filter cascade" is understood to mean a sequence of mean value filters, each of which converts the number of successive input values predefined by the filter length into a mean value and outputs it as an input value to the succeeding filter. In this connection, there are essentially two favorable variants: In the first variant, the sequence of individual measured values is divided into subsections of the filter length and a mean value is calculated and outputted for each section. The number of values inputted into the succeeding filter is drastically reduced relative to the number of values inputted into the preceding filter by a factor corresponding to the filter length. In the second variant, the mean values are each calculated in a continuous window of the filter length. This means that the number of calculated mean values corresponds approximately to the number of individual values inputted into the filter. By a suitable choice of filter lengths in the cascade, it is possible to filter out dominant interfering frequencies very reliably. The particular choice of filter lengths in this connection is a complex, case-specific undertaking, but is nevertheless known to and within the ordinary skill of a person skilled in the art.

As the inventors have recognized, an inherent characteristic of such a filter cascade is that the basic shape of pulse response, i.e., the transmission function of the filter cascade, is essentially dependent only on the ratio of the filter lengths of the individual filters to one another. A variation of the filter lengths without a change in their relative ratios to one another can change the position and width of transmission function on the frequency axis, but not its basic shape. The present invention makes use of this special characteristic.

The invention proceeds from a consideration that the primary interfering frequencies introduced by the conveyor movement will change in accordance with a change in the object sizes, especially with a change in the object length in the conveying direction. If the object length were reduced, for example, the interfering frequencies will shift to higher frequencies. The opposite holds for an increase in the object lengths. The invention now proposes that, rather than completely rearranging the filter cascade upon a change in object length, the filter lengths of the cascade be adapted without changing their relative ratio to one another. In other words, the filter lengths of the cascade will be scaled with a common scaling value. In particular, a linear (i.e., directly proportional) dependence of the scaling value on the object lengths has proven to be a suitable form of dependence.

A noteworthy advantage of this method is the rapid and flexible adaptation to changed object lengths, even when these should only appear briefly, e.g., for several packages in a package sorting system.

This flexible adaptability allows for automation of the object-size adaptation. To this end, the respective lengths of the objects are measured by a length sensor and a measured length value is transmitted to the evaluation unit for the corresponding setting of the scaling value. Length sensors that can be included in the check weigher for this purpose and that can be configured as a light barrier arrangement, for example, are known to the person skilled in the art, as are the required techniques for setting-up the evaluation unit, which for example can be accomplished through automatic programming of digital filters in a data processing system.

An important step toward preparing the process sequence according to the invention is the initial choice of filter lengths for a given initial size of an object. As a rule, this is done empirically, because the interfering frequencies to be filtered out are strongly dependent on the individual environment, the conveying speed, the object sizes and weights, etc. To simplify this empirical setup procedure, it is proposed that, to select the initial setting of the filter lengths, the individual measured weight values of a representative object be stored in a ring buffer and that the evaluation unit repeatedly carry out the calculation of the mean values on the stored values with iteratively varying filter lengths until the resulting weight value agrees with the actual weight value of the object. In other words, this means that the weighing of a plurality of objects with different filter settings is conducted virtually by simulating the new receipt of individual weight values of many objects through frequent repetition of the individual measured values of a single object stored in the ring buffer. This simulation with varying filter settings is repeated until the resulting weight value agrees with the (known) actual weight of the object. The term "agreement" in this case should be understood as "agreement within predefined tolerance rules," with the tolerance rules being adapted to the respective requirements of the individual case.

Proceeding from an already tested or standard predefined filter-length set-up, in special cases it may suffice to leave the ratio of filter lengths to one another constant during the iterative variation of the filter lengths as part of the setting-up process. In other words, this means that in such cases the setting procedure is restricted to finding the initial scaling value, in particular one, from which the object-length-dependent variations are derived during operation.

In a further development of the method according to the invention, it is provided that the same basic principle also be used for the adaptation of the filter set-up to different conveying speeds. This is achieved by varying the filter lengths by a common scaling value in correspondence with the conveying speeds. For automation in this connection, it is advantageous for a speed sensor to detect the conveying speed at regular intervals and transmit it to the evaluation unit for corresponding setting of the scaling value. Since the position of the primary interfering frequencies also essentially depends on the conveying speed, this further development of the invention allows for essentially unlimited use of the check weigher in an industrial production environment where the conveying speed can frequently vary for technical reasons and/or be varied by personnel or be product-dependent.

BRIEF DESCRIPTION OF THE DRAWINGS

Further features and advantages of the invention will be apparent from the following detailed description and from the drawings.

The drawings show.

DETAILED DESCRIPTION OF EXEMPLARY EMBODIMENTS

Figure 1:
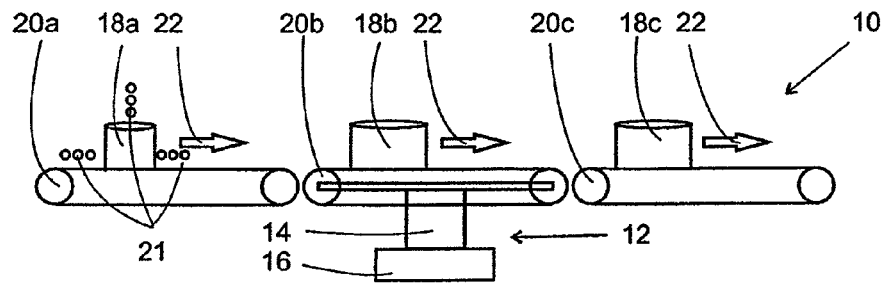
FIG. 1: a schematic representation of a check weigher.

FIG. 1 depicts a schematic representation of a check weigher 10. The check weigher 10 includes a weighing device 12 with a weight-sensitive zone 14 and a connected evaluation unit 16. In particular, the evaluation unit 16 can be configured on the basis of a microprocessor. Other standard components of the check weigher 10, e.g., a display and input device, are omitted from FIG. 1 for the sake of clarity.

Objects 18a-c of different sizes, which are to be subjected to the check weighing, are conveyed to the weighing device 12 by a conveyor belt 20 which has a plurality of sections 20a-20c and are led away. The center conveyor-belt section 20b in FIG. 1 is supported on the weight-sensitive zone 14 of the weighing device 12. From this, it follows that the weighing device 12 can weigh an object (18b in FIG. 1) that is located in conveyor-belt section 20b.

A light barrier arrangement 21, which is provided in section 20a of the conveyor belt, can help determine the sizes of the objects 18a-c before their weighing. In the depicted embodiment, the light barrier arrangement 21 is designed so that both the object height and a length in the conveying direction can be determined. Also possible are other variants in which fewer or more size parameters are detected. Rather than making a true size measurement, it is also possible to read and evaluate a marking, e.g., a bar code or a transponder, that is attached to the objects and contains size information, possibly through a connected database, using a suitable reader.

As indicated by the arrow 22, object 18b moves in the conveying direction at the conveying speed during the weighing. During this period in which object 18b is located on conveyor-belt section 20b, the weight-sensitive zone 14 of the weighing device 12, which in particular can comprise an A/D converter, supplies a sequence of n individual measured weight values $E_1, E_2, \ldots E_n$ at regular intervals, i.e., specifically at the converter frequency. This sequence of individual measured weight values represents a time-varying measuring signal in which the measured value caused by the weight of object 18b is superimposed by signals that must be ascribed to the aforementioned interference quantities.

Figure 2:
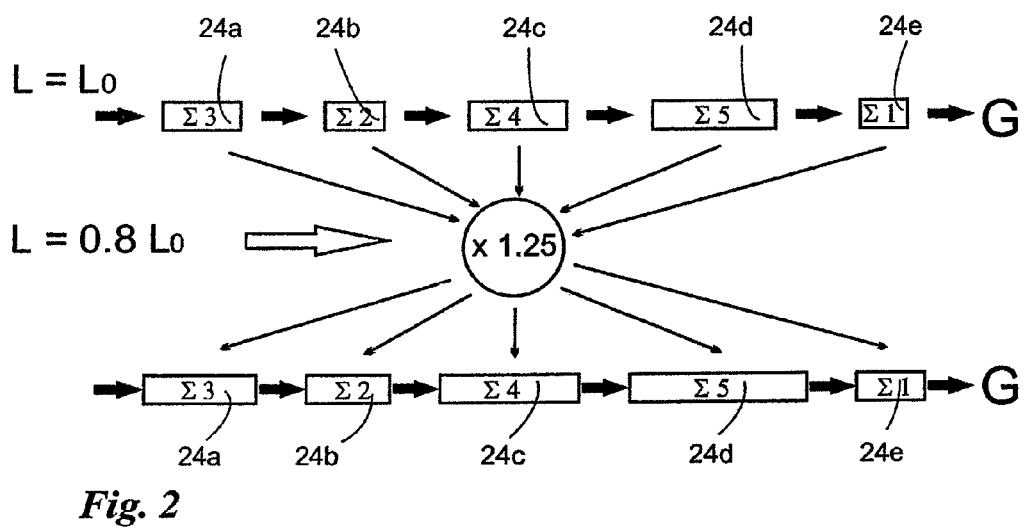
FIG. 2: a schematic representation of the scaling principle according to the invention.

To cleanse the signal of these interfering signals, it is sent through a cascade of mean value filters, as illustrated schematically in the top part of FIG. 2. In the illustrated embodiment, the filter cascade contains a sequence of five mean-value generators of different filter lengths connected in series. Each mean-value generator comprises a shift register, which is capable of storing one of the number of input values corresponding to the filter length. As soon as the register is filled, a mean value is generated out of the stored individual values and outputted as a first output value. Each new input value into the shift register replaces the oldest stored value and triggers the calculation of a new mean value of the single values currently contained in the memory and outputs this as the next output value. The resulting sequence of output mean values of the first mean-value generator is read into the second mean-value generator, which works according to the same principle but can have a different filter length. The values pass through the entire cascade in this manner, so that a filtered sequence of resulting weight values, indicated with G in FIG. 2, is produced. As an alternative to this, it is also possible to arrange the filter cascade so that a single resulting weight value results. This can be achieved, for example, (i) by suitably combining, e.g., averaging, a value sequence leaving the last filter, (ii) by selecting a single value from the output sequence of the last filter, or (iii) by having the filter cascade work batch-by-batch, rather than by the principle of the "rolling window" described above, thereby reducing the number of forwarded values in each filter stage.

The individual filter stages, which are designated with the reference characters 24a-e in FIG. 2, are schematically illustrated as blocks of different lengths, symbolizing their respectively different filter lengths. In the example of FIG. 2, it is assumed in particular that the individual filter stages 24a-e stand in a ratio of 3:2:4:5:1 to one another, a ratio that in FIG. 2 is indicated by way of the symbols $\Sigma3, \Sigma2, \Sigma4, \Sigma5, \Sigma1$. Expressed in absolute numbers, a filter-length ratio of 12:8:16:20:4 to the values to be averaged is a favorable choice in practice.

The concrete further use of the resulting weight value or values G is adapted as required to the particulars of the individual case. For example, a target weight of object 18b can be considered as achieved if a sequence of resulting weight values G overshoots and undershoots a predefined weight threshold a particular number of times. In cases in which a single resulting weight value G is calculated, this value can be compared with one or a plurality of predefined weight threshold values, for thereby controlling a subsequent sorting system (not illustrated in the figures). The special use of the resulting weight value or values G is not the subject matter of the present invention.

The lower portion of FIG. 2 schematically illustrates a mechanism that adapts to changes in the object length. In the depicted example, it is assumed that, due to a batch change between object 18b and object 18a, the object length L shortens from an initial object length $L_0$ by a factor of 0.8 to $L=0.8*L_0$. The light barrier arrangement 21 detects this change and transmits it to the evaluation unit 16. This unit, in turn, changes the filter lengths of filter stages 24a-e. This change is made for all filter stages 24a-e to the same extent, i.e., with the same, preferably linear, dependence, although it is also possible to implement nonlinear dependencies. In the depicted example of FIG. 2, a particularly advantageous dependence of the scaling value on the factor describing the change in length is realized, namely a directly proportional dependence. As illustrated in the lower portion of FIG. 2, the filter lengths of the individual filter stages 24a-e are each lengthened absolutely in the result, but their relative ratio to one another is retained. This means that the filter lengths still stand in the ratio 3:2:4:5:1 to one another. This leads to essentially the same weighing result for identical objects 18a-c, as symbolized by the resulting weight value G. This is a consequence of the fact that a linear scaling of the filter lengths of a cascade does not essentially change the basic shape of the transmission function of the filter cascade, but rather influences only its position and width.

Figure 3:
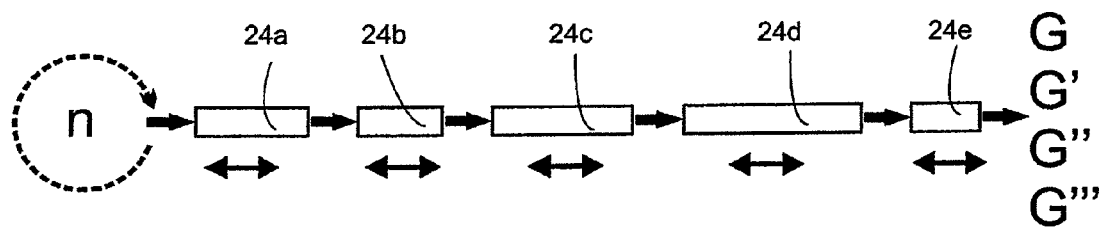
FIG. 3: a schematic representation of a preferred filter setting procedure.

FIG. 3 schematically represents a preferred method for setting a starting set-up of filter lengths of the cascade. To this end, the individual measured weight values $E_1, E_2, \ldots E_n$ of an object 18b are generated in the manner described above and stored in a ring buffer with n memory locations. Then the stored value sequence is repeatedly fed into the filter cascade with the filter lengths of the individual filter stages 24a-e being varied in each repetition step, which leads to different resulting weight values or value sequences G, G', G'', G''' . . . . In other words, the actual weighing of a plurality of objects 18a, 18b, 18c, . . . is replaced by the repeated filtering of the value sequence for object 18b that has been measured once. As soon as the resulting weight value or values have the expected and desired characteristics for the (known) object 18b, the setting process can be concluded and the filter set-up that has been found for the succeeding operation can be taken over in the manner explained.

The embodiments discussed in the special description and depicted in the figures represent only illustrative embodiments of the present invention. In light of the local disclosure, a wide spectrum of variation possibilities is available to the person skilled in the art. In particular, the number and arrangement of the filter stages of the cascade can be adapted to the particular case presented. It is also possible to use cascades with different sections, of which only one or a few sections follow the variation principle explained above, and one or a plurality of other sections remain constant, independently of the conveying speed or object size. The latter is particularly meaningful if it is known that interferences superimpose the measurement independently of object speed and size.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. A method for dynamically check weighing objects, comprising:
conveying the objects across a weight-sensitive zone of a weighing device with a conveying mechanism;
at regular intervals and from the weight-sensitive zone, supplying individual measured weight values, and deriving resulting weight values in a digital evaluation unit by calculating mean values using a plurality of cascading mean value filters; and
in the evaluation unit, varying respective filter lengths of the plurality of cascading mean value filters by varying only a common scaling value of the plurality of filters in accordance with at least one spatial dimension for given ones of the objects.

2. The method according to claim 1, wherein the scaling value varies in direct proportion to a length of the objects in the conveying direction.

3. The method according to claim 1, wherein the scaling value is directly proportional to the spatial dimension of the given ones of the objects.

4. The method according to claim 1, further comprising:
measuring the spatial dimension of each of the given ones of the objects with a sensor; transmitting respective measured values to the evaluation unit; and setting the scaling value in accordance with the respective measured values.

5. The method according to claim 1, further comprising:
selecting an initial setting of the filter lengths by storing the individual measured weight values of a representative one of the objects in a ring buffer, and repeating the mean value calculations in the evaluation unit on the stored values with respective filter lengths iteratively varied by iterative values of the scaling value until the resulting weight values match an actual weight of the representative object.

6. The method according to claim 5, wherein, during the iterative variation of the filter lengths, a ratio of the filter lengths to one another remains constant.

7. An apparatus for dynamically check weighing objects, comprising:
a weighing device with a weight-sensitive zone,
a conveying mechanism that conveys the objects across the weight-sensitive zone of the weighing device,
wherein the weight-sensitive zone is configured to supply individual measured weight values at regular intervals, and
a digital evaluation unit configured to derive resulting weight values by calculating mean values,
wherein the evaluation unit comprises a plurality of cascading mean value filters of different filter lengths and a filter-length adjuster configured to vary only a common scaling value of the filter lengths in accordance with at least one spatial dimension for given ones of the objects.

8. The apparatus according to claim 7, wherein the filter-length adjuster is configured to vary the common scaling value of the filter lengths in accordance with a length of the given objects in the conveying direction.

9. The apparatus according to claim 7, wherein the scaling value varies in direct proportion to the length of the objects.

10. The apparatus according to claim 7, further comprising:
a length sensor configured to output a length value of the given objects to the evaluation unit, wherein the evaluation unit is configured to vary the scaling value in accordance with the output length value.

11. The apparatus according to claim 7, wherein the evaluation unit further comprises a ring buffer in which the individual measured weight values of a representative one of the objects are stored, and the evaluation unit is further configured to repeat the mean value calculation of the buffered values with respective filter lengths iteratively varied by iterative values of the scaling value until the resulting weight values correspond to an actual weight of the representative object.

12. The apparatus according to claim 11, wherein, during the iterative variation of the filter lengths, a ratio of the filter lengths to one another remains constant.

* * * * *